United States Patent
Sung et al.

(10) Patent No.: US 9,208,389 B2
(45) Date of Patent: Dec. 8, 2015

(54) APPARATUS AND METHOD FOR RECOGNIZING CURRENT POSITION OF VEHICLE USING INTERNAL NETWORK OF THE VEHICLE AND IMAGE SENSOR

(75) Inventors: Kyung-Bok Sung, Daejeon (KR); Kyoung-Hwan An, Daejeon (KR); Dong-Yong Kwak, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 611 days.

(21) Appl. No.: 13/595,637

(22) Filed: Aug. 27, 2012

(65) Prior Publication Data

US 2013/0162824 A1 Jun. 27, 2013

(30) Foreign Application Priority Data

Dec. 22, 2011 (KR) ........................ 10-2011-0139851

(51) Int. Cl.
| | |
|---|---|
| *G01C 21/12* | (2006.01) |
| *G01S 19/48* | (2010.01) |
| *G06K 9/00* | (2006.01) |
| *G01C 21/00* | (2006.01) |
| *G01C 21/36* | (2006.01) |

(52) U.S. Cl.
CPC .......... *G06K 9/00798* (2013.01); *G01C 21/005* (2013.01); *G01C 21/3602* (2013.01); *G01S 19/48* (2013.01)

(58) Field of Classification Search
CPC .. G01S 19/48; G06K 9/00798; G01C 21/005; G01C 21/3602

USPC ........................................................ 701/523
See application file for complete search history.

(56) References Cited

U.S. PATENT DOCUMENTS

| | | | | |
|---|---|---|---|---|
| 5,117,363 | A * | 5/1992 | Akiyama et al. | 701/460 |
| 6,658,353 | B2 * | 12/2003 | Shimizu et al. | 701/410 |
| 7,928,905 | B2 * | 4/2011 | Broadbent | 342/357.71 |
| 2004/0167670 | A1 | 8/2004 | Goncalves et al. | |
| 2009/0041358 | A1 * | 2/2009 | Tanaka et al. | 382/195 |

(Continued)

FOREIGN PATENT DOCUMENTS

| | | | | |
|---|---|---|---|---|
| JP | 11271074 A | * | 10/1999 | G01C 21/00 |
| JP | 2004045227 A | * | 2/2004 | G01C 21/00 |

(Continued)

OTHER PUBLICATIONS

JPO machine translation of JP 2007-309670 (original JP document published Nov. 29, 2007).*

(Continued)

*Primary Examiner* — Behrang Badii
*Assistant Examiner* — David Testardi
(74) *Attorney, Agent, or Firm* — Rabin & Berdo, P.C.

(57) ABSTRACT

An apparatus and method for recognizing a current position of a vehicle are disclosed. The apparatus receive information about an initial position of a vehicle from an external input, and receive an image signal from an image sensor to take a picture of an identifiable object and extract image signal information corresponding to the identifiable object from the image signal, and connect to an internal network of the vehicle of the vehicle and receive information about a traveling state of the vehicle, and calculate the current position of the vehicle based on the information obtained.

12 Claims, 2 Drawing Sheets

(56) References Cited

U.S. PATENT DOCUMENTS

| | | | |
|---|---|---|---|
| 2009/0228204 A1* | 9/2009 | Zavoli et al. | 701/208 |
| 2009/0265070 A1* | 10/2009 | Okada et al. | 701/70 |
| 2010/0004856 A1* | 1/2010 | Kobori et al. | 701/208 |
| 2010/0061591 A1* | 3/2010 | Okada et al. | 382/103 |
| 2010/0082238 A1* | 4/2010 | Nakamura et al. | 701/208 |
| 2010/0169013 A1* | 7/2010 | Nakamura et al. | 701/213 |
| 2010/0176987 A1* | 7/2010 | Hoshizaki | 342/357.02 |
| 2010/0250133 A1* | 9/2010 | Buros | 701/216 |
| 2011/0161032 A1* | 6/2011 | Stahlin | 702/94 |
| 2011/0205363 A1* | 8/2011 | Suzuki | 348/148 |
| 2011/0216938 A1* | 9/2011 | Suzuki | 382/103 |
| 2012/0083285 A1* | 4/2012 | Shatsky et al. | 455/456.1 |
| 2012/0116676 A1* | 5/2012 | Basnayake et al. | 701/469 |

FOREIGN PATENT DOCUMENTS

| | | | | |
|---|---|---|---|---|
| JP | 2005326168 A | * | 11/2005 | G01C 21/00 |
| JP | 2007271515 A | * | 10/2007 | |
| JP | 2007271568 A | * | 10/2007 | |
| JP | 2007309670 A | * | 11/2007 | |
| JP | 2008145247 A | * | 6/2008 | |
| JP | 2008275381 A | * | 11/2008 | |
| JP | 2008298699 A | * | 12/2008 | |
| JP | 2011013075 A | * | 1/2011 | |
| KR | 10-2006-0102016 A | | 9/2006 | |
| KR | 10-2006-0132302 A | | 12/2006 | |
| KR | 10-2009-0001176 A | | 1/2009 | |
| WO | WO 2008009966 A2 | * | 1/2008 | G01C 21/30 |

OTHER PUBLICATIONS

JPO machine translation of JP 2008-145247 (original JP document published Jun. 26, 2008).*

* cited by examiner

APPARATUS AND METHOD FOR RECOGNIZING CURRENT POSITION OF VEHICLE USING INTERNAL NETWORK OF THE VEHICLE AND IMAGE SENSOR

CROSS-REFERENCE TO RELATED APPLICATIONS

This application claims priority to Korean Patent Application No. 10-2011-0139851, filed on Dec. 22, 2011, which is incorporated herein by reference in its entirety.

BACKGROUND OF THE INVENTION

1. Field of the Invention

Exemplary embodiments of the present invention relate to an apparatus and method for recognizing the current position of a vehicle using an internal network of the vehicle and an image sensor; and, particularly, to an apparatus and method for recognizing the current position of a vehicle using information detected by a sensor equipped to the vehicle in cooperation with an internal network of the vehicle, and information received from an image sensor, rather than recognizing information about the current position of the vehicle using a signal sent from a GPS satellite.

2. Description of Related Art

The global positioning system (GPS) is widely utilized in various fields at present. In particular, the GPS is actively used as a navigation system for use in vehicles to guide a user to a destination, and is installed in camera and cellular phones to perform an essential role in the supply of various services.

However, in order to apply a new technology, such as lane change guidance or obstacle avoidance guidance, to vehicles, an appliance having accuracy higher than that of the existing GPS is required.

For example, accurate information about the current position is indispensible information for self-driving cars in the field of autonomous vehicles. For this reason, a high-performance GPS has been used in the field of the autonomous vehicle, but since the high-performance GPS is expensive, it has not become very popular. A low-performance GPS has a problem in that it is hard to use in the autonomous vehicle because of its error.

As a route searching method for reducing error in the position measured by the GPS and accurately estimating the current position, dead reckoning and map matching have been utilized.

Dead reckoning is a process of estimating the current position of a vehicle from a reference position by calculating the moving direction and the moving distance of the vehicle. However, since dead reckoning is subject to the accumulation of error, many factors such as speed and direction must be continuously corrected. There is a drawback in that if the initial position value from which dead reckoning is commenced is not accurate, the accuracy of dead reckoning is very low.

Map matching is a process of automatically identifying the road on which a vehicle is traveling using the linear relationship between GPS latitude and longitude coordinates and the traveling direction of the vehicle, and then appropriately processing a screen when the vehicle position on a road of a digital map is not consistent with the GPS coordinates. Korean Unexamined Patent Publication No. 10-2006-0132302 discloses a method for correcting the current position of a vehicle by extracting a specific object from an image signal taken by an image pickup unit and performing map matching on the extracted object and object information stored in a map database. However, the map matching for correcting the current position using an image sensor and the previously established map data has a drawback in that since image processing is required, the processing entails latency, so it is hard to use map matching in cases in which it must be processed in real time.

SUMMARY OF THE INVENTION

An embodiment of the present invention is directed to an apparatus and method of recognizing the current position of a vehicle by obtaining values from sensors inside the vehicle via an internal network of the vehicle, and recognizing the current position of the vehicle through dead reckoning and map matching using an image sensor and a previously established database, without obtaining information about the current position of the vehicle using a signal sent from a GPS satellite.

Other objects and advantages of the present invention can be understood by the following description, and will become apparent with reference to the embodiments of the present invention. Also, it will be obvious to those skilled in the art to which the present invention pertains that the objects and advantages of the present invention can be realized by the means as claimed and combinations thereof.

In accordance with an embodiment of the present invention, an apparatus for recognizing the current position of a vehicle including an initial position-receiving unit configured to receive information about the initial position of the vehicle from an external input; an image data processing unit configured to receive an image signal from an image sensor that is equipped to the vehicle to take a picture of an identifiable object which is stationary near the vehicle and extract image signal information corresponding to the identifiable object from the image signal; a database unit including geographic information and information about the identifiable object corresponding to the position of the vehicle; an internal network of the vehicle connection unit configured to connect to an internal network of the vehicle of the vehicle and receive information about the traveling state of the vehicle; and a position calculation unit configured to calculate the current position of the vehicle based on the information received from the initial position-receiving unit, the image data processing unit, the database unit and the internal network of the vehicle connection unit.

The position calculation unit may include a positioning-recording section configured to record the information about the current position of the vehicle in real time; a map-matching section configured to perform map matching on the image signal information about the identifiable object, which is extracted from the image data processing unit, and the information about the identifiable object corresponding to the information about the current position of the vehicle received from the database unit, and correct the information about the current position of the vehicle recorded in the position-recording section; and a calculation section configured to calculate the current position of the vehicle using the corrected information about the position of the vehicle recorded in the position-recording unit and information about the traveling state of the vehicle received via the internal network of the vehicle connection unit.

In this instance, when the information about the initial position of the vehicle is input from the initial position-receiving unit, the positioning-recording section may take the information about the initial position as information about the current position of the vehicle.

When the vehicle is started again after the apparatus has been shut down, the positioning-recording section may take information about the final position of the vehicle which is stored in the position-recording unit when the apparatus is shut down, as the information about the current position of the vehicle.

In this instance, the initial position-receiving unit may receive the information about the initial position of the vehicle through the directive input of a driver or an input from a sensor equipped to the vehicle or an external network system.

The image data processing unit may analyze data corresponding to the road among the image signals received from the image sensor, and may extract the information about the identifiable object displayed on the road on which the vehicle is traveling.

The information about the identifiable object displayed on the road on which the vehicle is traveling may include general road information about a road shape and a road curve, and location information for all road markings of a stop line, a crosswalk, a arrow for indicating the direction, and information letters.

The internal network of the vehicle connection unit may receive detection information about the traveling state of the vehicle, which is detected by a sensor equipped to the vehicle, via an internal network of the vehicle.

When there is no result from the map matching performed by the map-matching section, the current position of the vehicle may be calculated using the position information recorded in the positioning-recording section prior to the correction and the information about the traveling state of the vehicle received via the internal network of the vehicle connection unit.

In accordance with another embodiment of the present invention, a method for recognizing the current position of a vehicle includes receiving information about the initial position of the vehicle from an external input; taking a picture of an identifiable object displayed on a road on which the vehicle is traveling, generating an image signal; receiving geographic information and information about the identifiable object displayed on the road in the geographic information from a database, analyzing data corresponding to the road from the image signal and the information about the identifiable object displayed on the road, extracting the information about the identifiable object, and performing the map matching on the image signal information about the identifiable object and the information about the identifiable object corresponding to the current position of the vehicle; correcting the information about the current position of the vehicle using the result obtained from the map matching; connecting to an internal network of the vehicle and collecting information about the traveling state of the vehicle from the internal network of the vehicle; and calculating the current position of the vehicle using the corrected information about the position of the vehicle and the information about the traveling state of the vehicle.

Collecting the information about the traveling state of the vehicle may be performed based on the information detected by at least one of a handle angle sensor, a wheel speed sensor, and a radar sensor which are equipped to the vehicle.

When there is no result from the map matching performed at the map matching, calculating the current position of the vehicle may calculate the current position of the vehicle using the information about the current position of the vehicle and the information about the traveling state of the vehicle.

With the configuration of the present invention, since the apparatus and method for recognizing the current position of the vehicle can provide the information about the current position of the vehicle without using a GPS, it is possible to detect the position of the vehicle in a space such as a basement garage, the inside of building, or a downtown area, which would interfere with a GPS signal.

In addition, since the present invention is connected to the internal network of the vehicle to use the information detected by the existing sensors, which are for detecting the traveling state of the vehicle and are equipped to the vehicle when calculating the current position of the vehicle, additional sensors are not required.

Furthermore, since only specific data displayed on the road among the information recorded in the image signal generated by the image sensor is detected, the extent of image processing is reduced, and thus it is possible to process the data quickly.

DESCRIPTION OF SPECIFIC EMBODIMENTS

Figure 1:
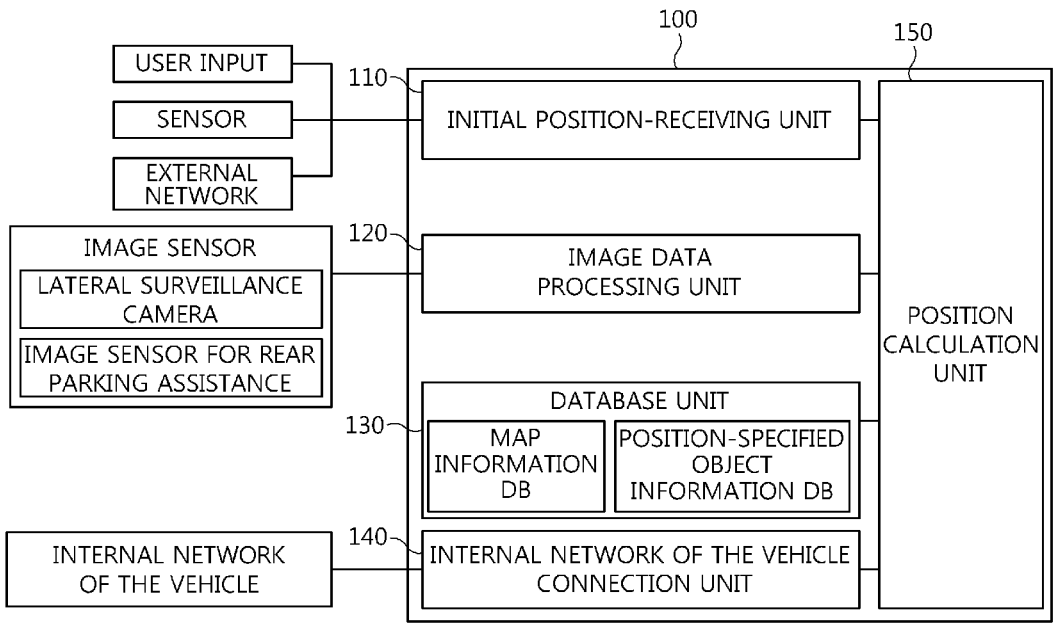
FIG. 1 is a block diagram illustrating an apparatus for recognizing the current position of a vehicle according to an embodiment of the present invention.

Exemplary embodiments of the present invention will be described below in more detail with reference to the accompanying drawings. The present invention may, however, be embodied in different forms, and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The apparatus and method for recognizing the current position of a vehicle according to an embodiment of the present invention will now be described in detail with reference to the accompanying drawings.

FIG. 1 is a block diagram illustrating the apparatus for recognizing the current position of the vehicle according to an embodiment of the present invention.

With reference to FIG. 1, a vehicle position recognizing apparatus 100 according to the present invention includes an initial position-receiving unit 110, an image data processing unit 120, a database unit 130, an internal network of the vehicle connection unit 140, and a position calculation unit 150.

The initial position-receiving unit 110 receives information about the initial position of the vehicle from an exterior so as to enable the vehicle position recognizing apparatus 100 to start accurate detection of the current position of the vehicle. The information about the initial position of the vehicle includes the current position of the vehicle and the traveling direction of the vehicle. The information about the initial position of the vehicle is input to the initial position-receiving unit 110 directly by a user, from a sensor, such as a GPS sensor, capable of tracing the current position of the vehicle, or from an external network using wireless communication such as Wi-Fi, CDMA or Hi-pass. Since the information about the initial position of the vehicle received from the initial position-receiving unit 110 corresponds to an initial value so as to enable the vehicle position recognizing apparatus 100 to start the accurate detection of the vehicle, the information is used only as an initial value when the vehicle position recognizing apparatus 100 is started. The information is not used unless a new input is necessary for detecting the accurate initial position of the vehicle, such as the case in which the vehicle is towed and thus the current position of the vehicle is different from the previous position record.

The image data processing unit 120 receives an image signal generated when an existing image sensor equipped to the vehicle takes a picture of an identifiable object of which the position on the road near the vehicle is specified. Recently, vehicles are equipped with a plurality of image sensors, including an image sensor for measuring the distance from the car ahead, an image sensor for rear parking assistance, and a lateral surveillance camera. These image sensors are directly connected to the image data processing unit, or separately connected to an image data processing unit via a multimedia network, since its bit rate is high. The image data processing unit 120 receives the image signal via the direct connection of the image sensor or the multimedia network.

In addition, the image data processing unit 120 extracts the identifiable object of which the position is specified (hereinafter referred to as position-specified object), for example, a traffic light, a traffic sign, a traffic facility, a landmark, or a region in which the object is positioned, from the image signals.

According to this embodiment of the present invention, the image data processing unit 120 analyzes the data corresponding to the road among the image signals received from the image sensor, and extracts the information about the identifiable object displayed on the road on which the vehicle is traveling. That is, the image data processing unit 120 according to the vehicle position recognizing apparatus 100 of the present invention is characterized in that data processing is not performed on all of the image signal data to, but is performed on a part of the data corresponding to the road among all of the image signal data to find the position-specified object. As a result, it is possible to reduce the amount of data that need to be processed in the image data processing unit 120, thereby increasing the processing speed of the image data.

In the image data processing unit 120 according to another embodiment of the present invention, the information about the identifiable object displayed on the road on which the vehicle is traveling includes general road information, such as the road shape and curves in the road, and all road markings, such as a stop line, a crosswalk, and a road sign.

The database unit 130 includes a geographic information database containing geographic information about each area in a recording medium such as a CD-ROM, and a database containing specific object information about the area and its image. The information about the position-specified object may include information about, for example, a road network, a road shape, a road curve, a road width, and a lane, and information about, for example, a stop line, a crosswalk, a directional arrow, and a direction board.

It is noted that the above description is merely illustrative, and the database unit 130 includes other information which will be apparent to those skilled in the art.

The internal network of the vehicle connection unit 140 is connected to the internal network of the vehicle, and receives a lot of information detected by the sensors sent via the network of interest. The internal network of the vehicle is adapted to transmit data between distributed electronic modules via a series data bus, and to configure a single network capable of connecting all electronic devices in the vehicle. A typical internal network of the vehicle is a controller area network (CAN), a local interconnect network (LIN), FlexRay, or the like. Recently, electronic devices, such as ABS (Anti-Brake System), ESC (Electronic Stability Control), and VDC (Vehicle Dynamic Control), are installed in vehicles, so that sensor information indicating the current travelling state of the vehicle is sent to the vehicle position recognizing apparatus 100 via the internal network of the vehicle. The vehicle position recognizing apparatus 100 according to the present invention collects the information about the traveling state of the vehicle from the internal network of the vehicle via the internal network of the vehicle connection unit 140. The existing vehicle position recognizing apparatus collects the information about the traveling of the vehicle from additional sensors, such as a gyroscope or a trip meter, installed in the vehicle to calculate the current position of the vehicle using dead-reckoning, but the vehicle position recognizing apparatus 100 collects the information from the sensors in the vehicle on the internal network of the vehicle via the internal network of the vehicle connection unit 140 to calculate the current position of the vehicle, thereby reducing the cost of installing new sensors by the use of the existing sensors in the vehicle, rather than installing separate sensors.

The information about the traveling state of the vehicle which is collected via the internal network of the vehicle connection unit 140 according to this embodiment of the present invention may be collected from the information detected by at least one of a handle angle sensor, a wheel speed sensor, and a radar sensor generally equipped to the vehicle, but the present invention is not limited thereto.

The position calculation unit 150 calculates the current position of the vehicle based on the information collected by the initial position-receiving unit 110, the image data processing unit 120 and the internal network of the vehicle connection unit 140, and the information established in the database unit 130. The position calculation unit 150 can calculate the current position of the vehicle by performing map matching and dead reckoning on the received information, without using the signal sent from the GPS satellite. The position calculation unit 150 according to the present invention will be described in detail with reference to FIG. 2.

Figure 2:
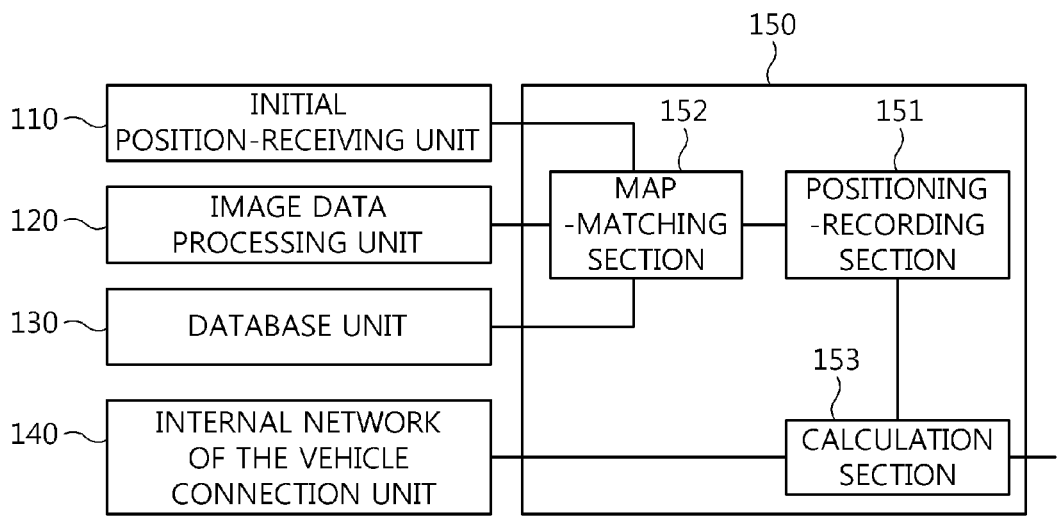
FIG. 2 is a block diagram illustrating an apparatus for recognizing the current position of a vehicle according to an embodiment of the present invention.

FIG. 2 is a block diagram illustrating the position calculation unit 150 according to the embodiment of the present invention.

With reference to FIG. 2, the position calculation unit 150 includes a positioning-recording section 151, a map-matching section 152, and a calculation section 153.

The positioning-recording section 151 records the information about the current position of the vehicle in real time.

When the information about the initial position of the vehicle is input from the initial position-receiving unit 110, the positioning-recording section 151 according to this embodiment of the present invention recognizes the input information about the initial position as the information about the current position of the vehicle. That is, when the vehicle position recognizing apparatus 100 of the present invention starts or the information about the initial position is received by the external input during driving of the vehicle, the positioning-recording section 151 recognizes the received position information as the information about the current position of the vehicle and records it.

In addition, when the vehicle position recognizing apparatus 100 restarts after a shutdown, the positioning-recording section 151 according to this embodiment of the present invention recognizes the information about the final position of the vehicle which is stored in the position-recording unit at the end of the vehicle position recognizing apparatus 100 as the information about the current position of the vehicle. That is, the positioning-recording section 151 of the present invention stores the position result calculated by the position calculation unit 150 for a period of time, and takes the position about the position of the vehicle finally stored in the positioning-recording section 151 as the information about the current position of the vehicle when the vehicle position recognizing apparatus 100 is restarted after being stopped. Therefore, the information about the current position of the vehicle can be used for the calculation of the position in the position calculation unit 150.

The map-matching section 152 matches the geographic information corresponding to the information about the current position of the vehicle and the information about the position-specified object with the position-specified object extracted by the image data processing unit 120, and corrects the information about the current position of the vehicle based on the map matching result.

That is, the map-matching section 152 of the present invention compares the information about the position-specified object at the area, in which the vehicle is positioned, stored in the database unit 130, with the position-specified object extracted from the image data processing unit 120, and corrects the information about the current position of the vehicle and about the traveling direction of the vehicle from the database unit 130.

The calculation section 153 calculates the current position of the vehicle by performing dead reckoning based on the information about the traveling state of the vehicle detected by the sensors which is received from the internal network of the vehicle via the internal network of the vehicle connection unit 140. In this instance, the dead reckoning is a process of obtaining the position and direction of the vehicle using only the information detected by the sensors sent from the internal network of the vehicle, without using the information obtained from an external sensor such as a satellite or ground equipment. Then, the calculation section 153 calculates the current position of the vehicle by correcting the calculated position of the vehicle using the information about the position of the vehicle corrected in the map-matching section 152.

When there is no result from the map matching performed by the map-matching section 152, the vehicle position recognizing apparatus 100 according to this embodiment of the present invention calculates the current position of the vehicle using the position information recorded in the positioning-recording section 151 and the information about the traveling state of the vehicle received via the internal network of the vehicle connection unit 140, without using the position information corrected by the map-matching section 152. That is, in the vehicle position recognizing apparatus 100 of the present invention, the result obtained by performing the map matching in the map-matching section 152 is not directly used by the calculation section 153, but is used to correct the position records stored in the positioning-recording section 151. Even if the result obtained by performing the map matching in the map-matching section 152 fails, it does not impede the calculation section 153, and it is possible to continuously recognize the current position of the vehicle. In addition, even if the map-matching section 152 and the calculation section 153 have different processing speeds, respective results can be applied through the positioning-recording section 151.

Next, the method for recognizing the current position of the vehicle will be described in detail with reference to FIG. 3.

Figure 3:
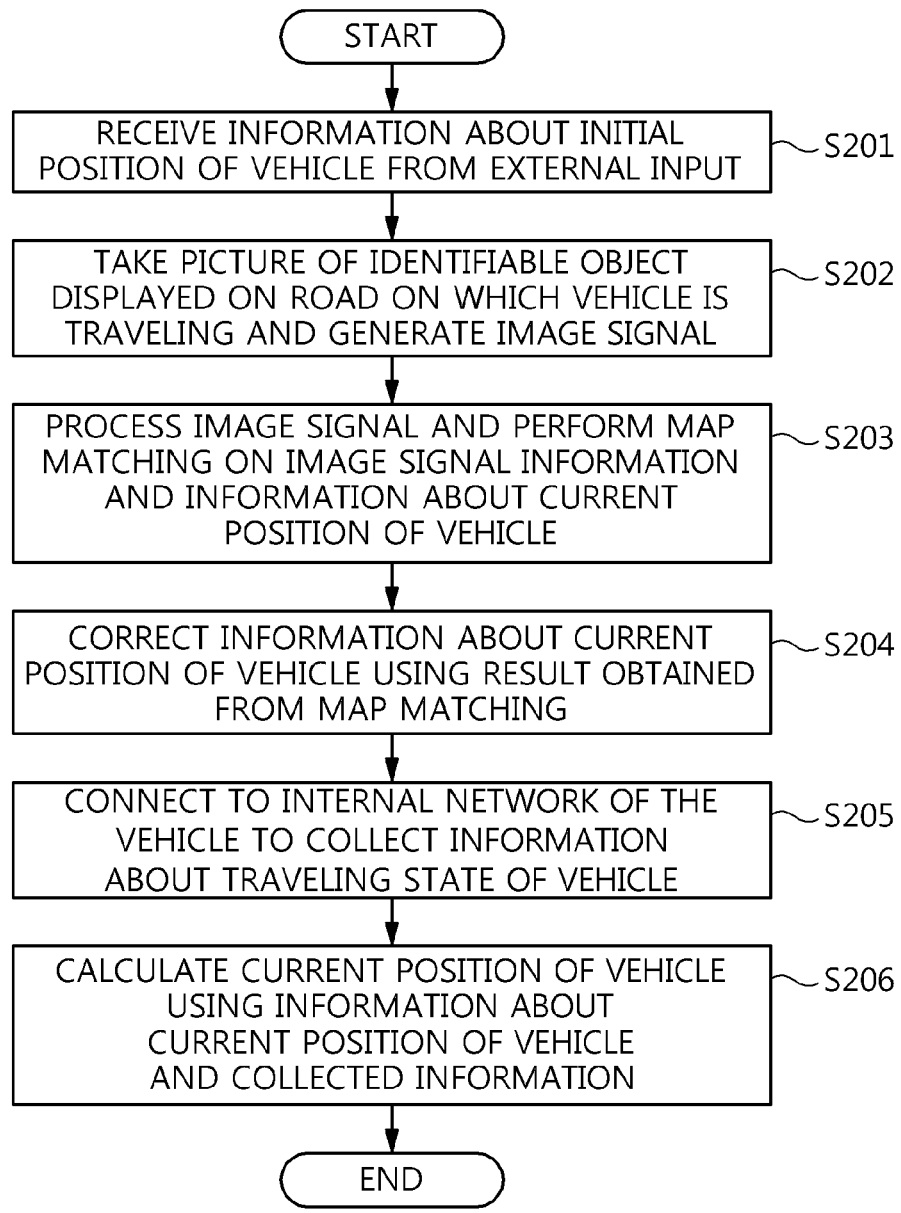
FIG. 3 is a flowchart illustrating a method for recognizing the current position of a vehicle according to an embodiment of the present invention.

FIG. 3 is a flowchart illustrating the method for recognizing the current position of the vehicle according to an embodiment of the present invention.

First, the initial position-receiving unit 110 receives the information about the initial position of the vehicle from the exterior, and the information about the initial position of the vehicle includes the current position of the vehicle and the traveling direction of the vehicle (S201).

The image sensor equipped to the vehicle takes a picture of the identifiable object displayed on the road on which the vehicle is traveling and generates the image signal (S202). The information about the identifiable object displayed on the road on which the vehicle is traveling includes the general road information, such as the road shape and curves in the road, and all road marks, such as stop lines, crosswalks, and road signs.

The database unit 130 identifies the geographic information corresponding to the information about the current position of the vehicle and the information about identifiable objects displayed on the road, and the image data processing unit 120 analyzes and extracts a portion of the data corresponding to the road among the image signals received from the image sensor, and performs map matching on the image signal information and the information about the identifiable object displayed on the road (S203).

The information about the current position of the vehicle is corrected using the result obtained from the map matching (S204).

The current position of the vehicle is calculated based on the corrected position information and the information detected by the existing inner sensors equipped to the vehicle and connected to the internal network of the vehicle via the internal network of the vehicle connection unit 140 (S205). The vehicle position recognizing apparatus 100 can estimate the position of the vehicle by performing dead reckoning using the position information and the detected information, but the present invention is not limited thereto. In addition the inner sensor includes a handle angle sensor, a wheel speed sensor, and a radar sensor generally provided in vehicles, but the present invention is not limited thereto.

According to the embodiment of the present invention, in the case in which no result is obtained from the map matching due to the failure of the map matching step, the current position of the vehicle is calculated based on the information about the position of the vehicle prior to the correction and the information about the traveling of the vehicle detected by the inner sensors and received via the internal network of the vehicle connection unit 140 (S206).

While the present invention has been described with respect to specific embodiments thereof, it will be apparent to those skilled in the art that various changes and modifications may be made without departing from the spirit and scope of the invention as defined in the following claims.

What is claimed is:

1. An apparatus for recognizing a current position of a vehicle, comprising at least one processor and storage device configured to implement:

an initial position-receiving unit configured to receive information about an initial position of the vehicle from an external input;

an image data processing unit configured to receive an image signal from an image sensor that is equipped to the vehicle to take a picture of an identifiable object which is stationary near the vehicle, and extract image signal information corresponding to the identifiable object from the image signal;

a database unit including geographic information and information about the identifiable object corresponding to the current position of the vehicle;

an internal network of the vehicle connection unit configured to connect to an internal network of the vehicle, and receive information about a traveling state of the vehicle; and a position calculation unit configured to calculate the current position of the vehicle based on the information received from the initial position-receiving unit, the image data processing unit, the database unit and the internal network of the vehicle connection unit;

wherein the position calculation unit includes a map-matching section configured to perform map matching on the image signal information about the identifiable object, which is extracted from the image data processing unit, and the information about the identifiable object corresponding to the information about the current position of the vehicle received from the database unit, and correct the information about the current position of the vehicle; and a calculation section configured to calculate the current position of the vehicle using the corrected information about the current position of the vehicle and the information about the traveling state of the vehicle.

2. The apparatus for recognizing the current position of the vehicle of claim 1, wherein the position calculation unit further includes:

a positioning-recording section configured to record the information about the current position of the vehicle in real time.

3. The apparatus for recognizing the current position of the vehicle of claim 2, wherein when the information about the initial position of the vehicle is input from the initial position-receiving unit, the positioning-recording section recognizes the information about the initial position as information about the current position of the vehicle.

4. The apparatus for recognizing the current position of the vehicle of claim 3, wherein when there is no result from the map matching performed by the map-matching section, the current position of the vehicle is calculated using the position information recorded in the positioning-recording section prior to the correction and the information about the traveling state of the vehicle received via the internal network of the vehicle connection unit.

5. The apparatus for recognizing the current position of the vehicle of claim 2, wherein when the apparatus restarts after a shutdown, the positioning-recording section recognizes information about a final position of the vehicle which is stored in the position-recording unit at the shutdown of the apparatus as the information about the current position of the vehicle.

6. The apparatus for recognizing the current position of the vehicle of claim 1, wherein the initial position-receiving unit receives the information about the initial position of the vehicle through direction input of a driver or an input from a sensor equipped to the vehicle or an external network system.

7. The apparatus for recognizing the current position of the vehicle of claim 1, wherein the image data processing unit analyzes data corresponding to the road among the image signal received from the image sensor, and extracts the information about the identifiable object displayed on the road on which the vehicle is traveling.

8. The apparatus for recognizing the current position of the vehicle of claim 7, wherein the information about the identifiable object displayed on the road on which the vehicle is traveling includes general road information about a road shape and a road curve, and location information for all road markings of a stop line, a crosswalk, an arrow for indicating the direction, and information letters.

9. The apparatus for recognizing the current position of the vehicle of claim 1, wherein the internal network of the vehicle connection unit receives detection information about a traveling state of the vehicle, which is detected by a sensor equipped to the vehicle, via an internal network of the vehicle.

10. A method for recognizing a current position of a vehicle, comprising:

receiving information about an initial position of the vehicle from an external input;

taking a picture with an image sensor equipped to the vehicle of an identifiable object displayed on a road on which the vehicle is traveling, and generating an image signal;

receiving geographic information and information about the identifiable object displayed on the road in the geographic information from a database, analyzing data corresponding to the road among the image signal and the information about the identifiable object displayed on the road, extracting the information about the identifiable object, and performing map matching on the image signal information about the identifiable object and the information about the identifiable object corresponding to the current position of the vehicle;

correcting the information about the current position of the vehicle using a result obtained from the map matching;

connecting to an internal network of the vehicle and collecting information about a traveling state of the vehicle from the internal network of the vehicle; and calculating the current position of the vehicle using the corrected information about the position of the vehicle and the information about the traveling state of the vehicle.

11. The method for recognizing the current position of the vehicle of claim 10, wherein the collecting of the information about the traveling state of the vehicle is performed based on the information detected by at least one of a handle angle sensor, a wheel speed sensor, and a radar sensor which are equipped to the vehicle.

12. The method for recognizing the current position of the vehicle of claim 10, wherein when there is no result from the map matching performed at the map matching, calculating the current position of the vehicle calculates the current position of the vehicle using the information about the current position of the vehicle and the information about the traveling state of the vehicle.

* * * * *